United States Patent
Wode

[11] Patent Number: 6,056,277
[45] Date of Patent: May 2, 2000

[54] AIR SPRING ARRANGEMENT

[75] Inventor: Stefan Wode, Langenhagen, Germany

[73] Assignee: Continental AG, Hannover, Germany

[21] Appl. No.: 09/038,895

[22] Filed: Mar. 12, 1998

[30] Foreign Application Priority Data

Mar. 13, 1997 [DE] Germany ............... 197 10 399

[51] Int. Cl.[7] ................. F16F 5/00; F16F 9/43; F16F 9/18; B60G 11/26
[52] U.S. Cl. .................. 267/64.11; 267/64.28; 267/124; 267/256
[58] Field of Search ............ 267/64.11, 64.28, 267/124, 256; 251/63, 62

[56] References Cited

U.S. PATENT DOCUMENTS

| | | | |
|---|---|---|---|
| 674,606 | 5/1901 | Forsyth | 251/63 |
| 813,577 | 2/1906 | Oakman | 251/63 |
| 1,196,121 | 8/1916 | Larsen | 251/63 |
| 3,036,807 | 5/1962 | Lucky et al. | 251/63 |
| 3,854,706 | 12/1974 | Johnston | 267/116 |
| 3,966,223 | 6/1976 | Carr | 267/256 |
| 4,650,151 | 3/1987 | McIntyre | 251/14 |
| 4,694,730 | 9/1987 | Krieger et al. | 251/63 |
| 5,094,428 | 3/1992 | Farello et al. | |
| 5,320,280 | 6/1994 | Murphy et al. | 251/63 |

FOREIGN PATENT DOCUMENTS

| | | |
|---|---|---|
| 1914696 | 10/1969 | Germany . |
| 07238969 | 9/1995 | Japan . |
| 1598896 | 9/1981 | United Kingdom . |

*Primary Examiner*—Christopher P. Schwartz
*Assistant Examiner*—Jeffrey Woller
*Attorney, Agent, or Firm*—Walter Ottesen

[57] ABSTRACT

The invention relates to an arrangement which includes an air spring (2), an ancillary volume (4) and a connecting line (6) which connects the air spring (2) and the ancillary volume (4) to each other. A valve (12), which is actuated by air pressure, is disposed in the connecting line (6). The valve (12) includes a cylinder (14) having a chamber (16) wherein a hollow piston (18) is mounted so as to be axially movable. In an open position of the hollow piston (18), the valve (12) clears the connecting line (6); whereas, the connecting line (6) is blocked in a closed position of the hollow piston (18). The invention also relates to a valve which is actuated by air pressure.

7 Claims, 3 Drawing Sheets

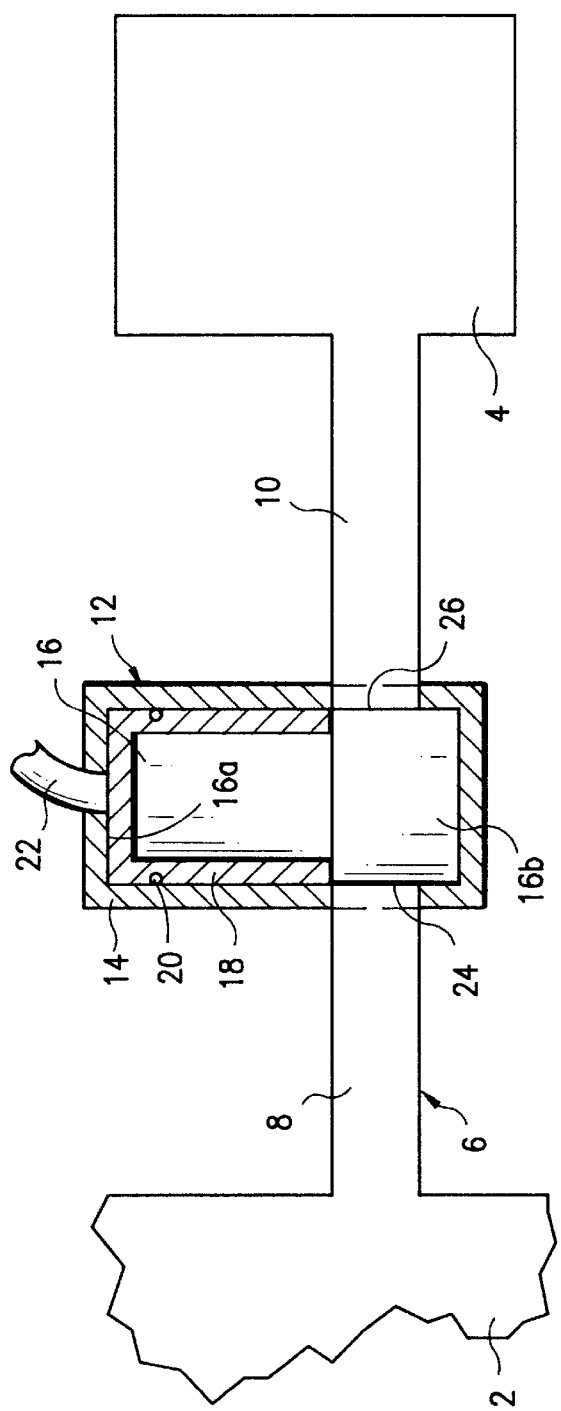
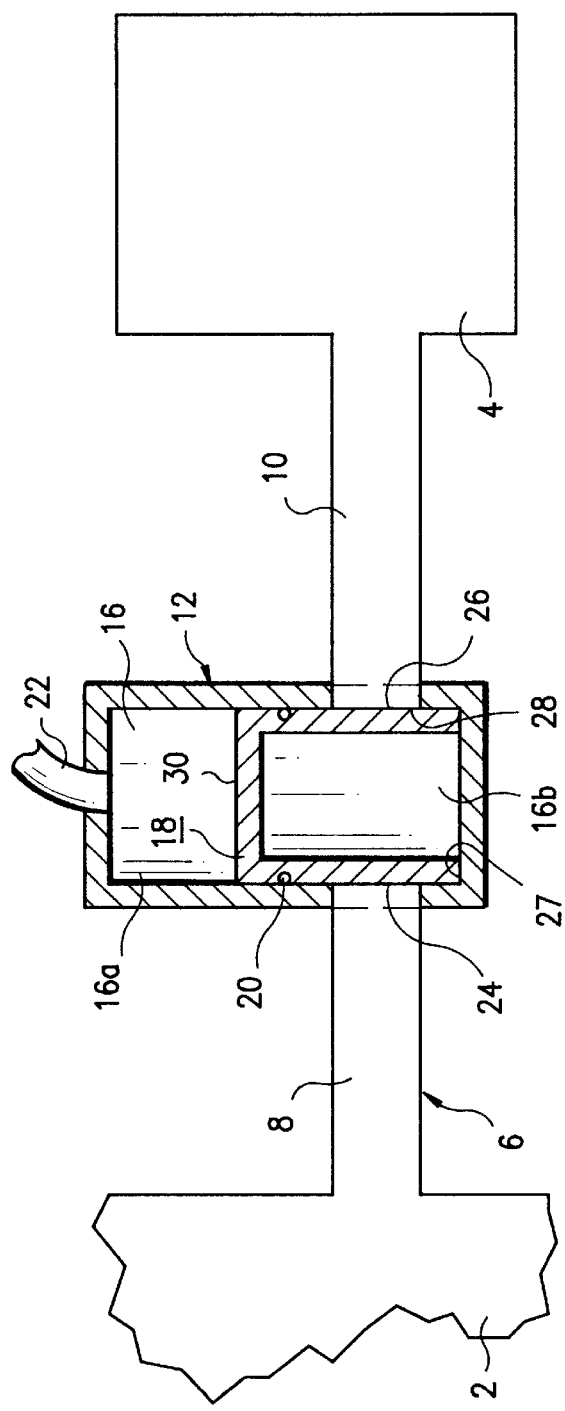

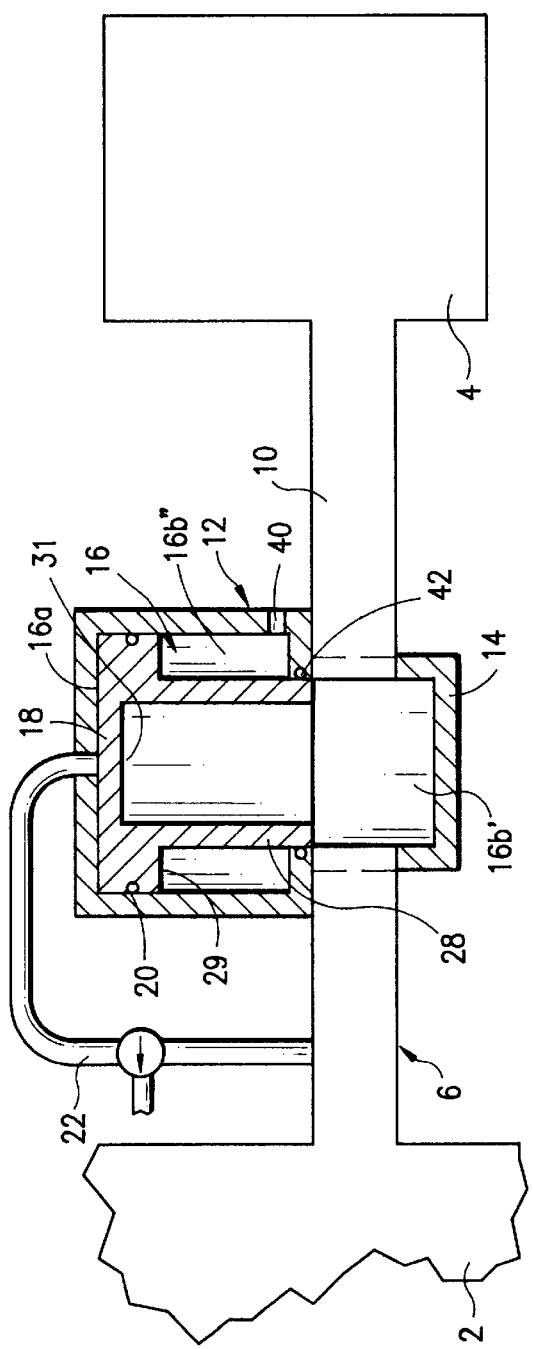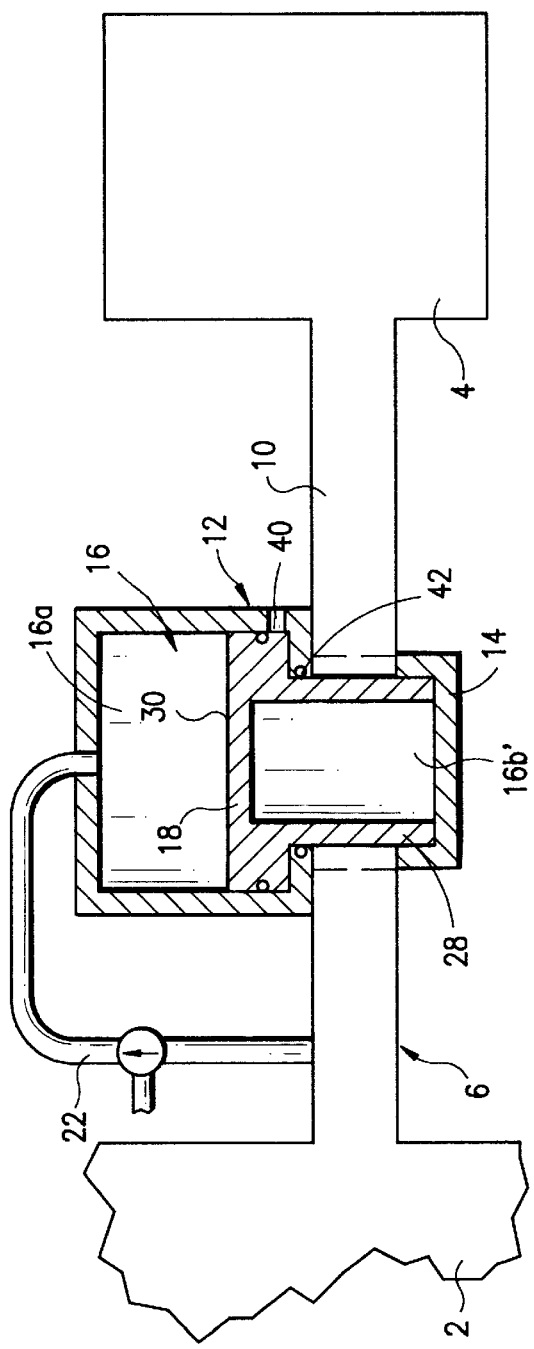

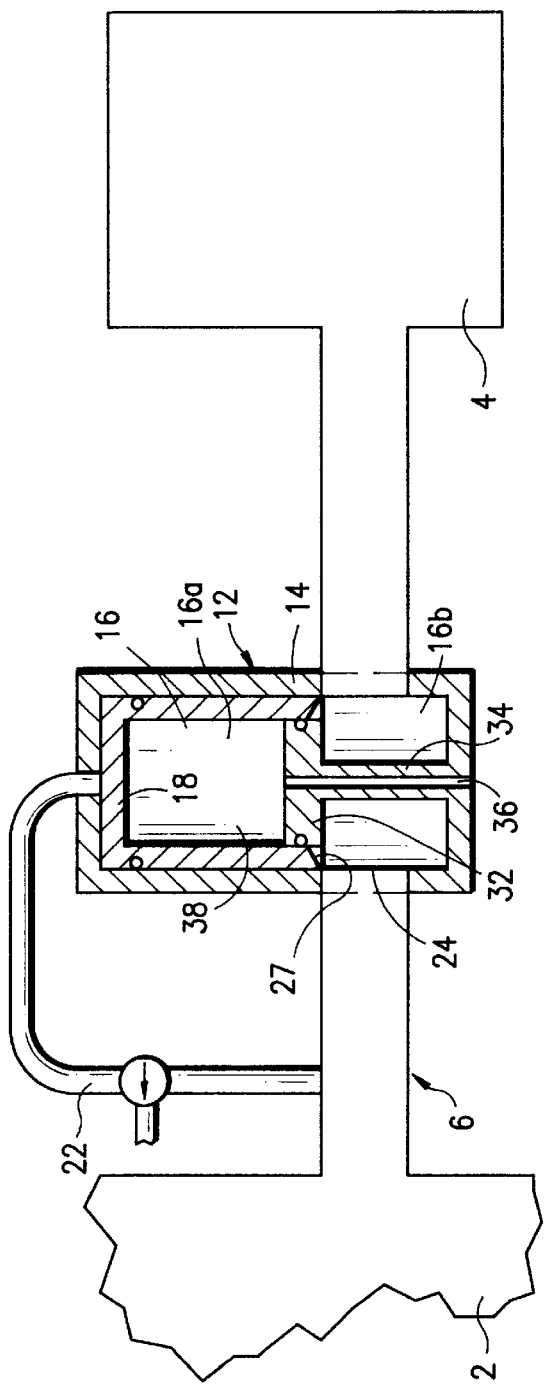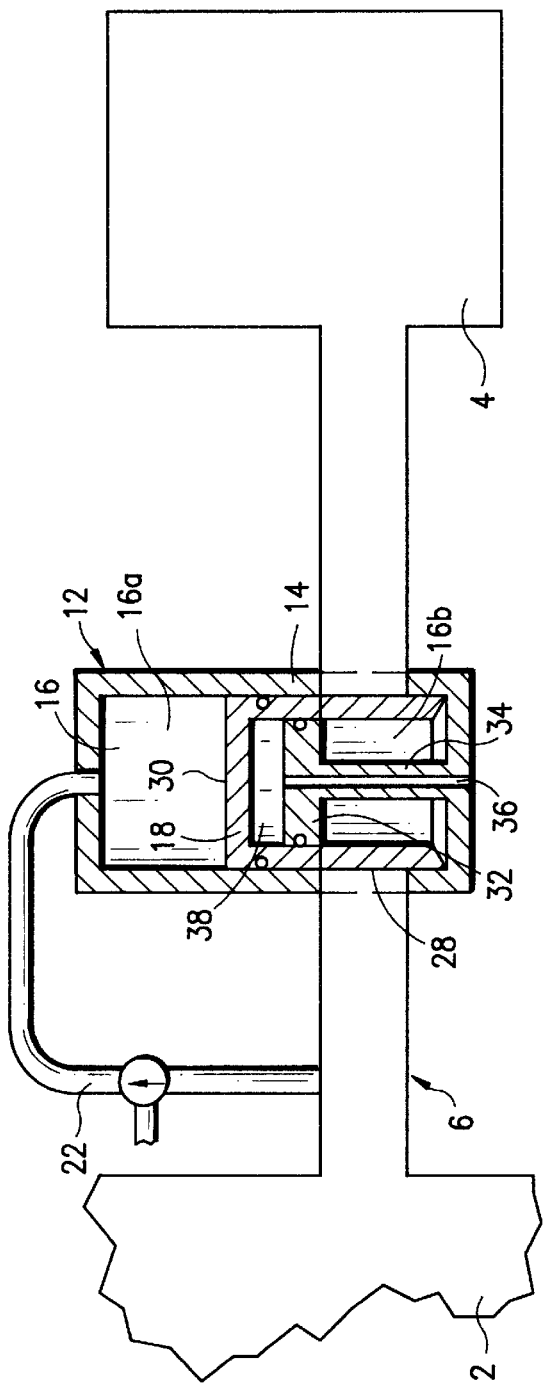

AIR SPRING ARRANGEMENT

FIELD OF THE INVENTION

The invention relates to an arrangement having an air spring and an ancillary volume which is connected to the air spring via a connecting line. The arrangement includes a valve actuated by air pressure. The valve has a closed position wherein the connecting line is blocked and an open position wherein the connecting line is clear. The invention also relates to a valve, which can be actuated by air pressure, and a connecting line, which connects two closed-off air volumes with each other. In a closed position of the valve, the line is blocked and in an open position of the valve, the line is clear.

BACKGROUND OF THE INVENTION

In present-day motor vehicles, air springs are used increasingly as a suspension because they make possible a comfortable suspension as well as a level control of the vehicle. The air springs of the motor vehicle are, preferably, connected via a connecting line to an ancillary volume. The stiffness of the air spring can be adjusted with the aid of this ancillary volume. The connecting line has a large cross section so that air can be exchanged between the air spring and the ancillary volume with an adequately high dynamic. In this way, it is, for example, possible that air can be transferred from the air spring into the ancillary volume so that the air spring can deflect softly even for a short-term shortening of the air spring such as when driving over an obstacle. A valve is connected into the connecting line and this valve blocks the connecting line in its closed position and clears the connecting line in its open position. Preferably, a valve, which can be actuated by air pressure, is used because with a valve of this kind, large cross sections in a connecting line can be switched in a simple manner. During general driving operation of the vehicle, the valve is in the open position so that the air spring is connected continuously to the ancillary volume and so that the air spring can deflect softly thereby ensuring a high degree of suspension comfort of the motor vehicle.

There are, however, driving situations in which a soft comfortable displacement of the air spring is not required; rather, a high stiffness of the air spring is needed. For example, when driving through a curve, the air springs of all wheels should have a high stiffness so that the vehicle does not lean too much when going through the curve. A driving situation of this kind is, for example, detected by sensors and the valve in the connecting line is driven and transferred from the open position into the closed position so that the connecting line is blocked. The air spring is then no longer connected to the ancillary volume so that the air spring exhibits a higher stiffness.

An end of a driving situation which requires a high stiffness of one or several air springs of the motor vehicle, is, in turn, detected by the sensors and the corresponding valves in the connecting lines are again driven so that the valves, in principle, can transfer from the closed position into the open position. Here, and notwithstanding the driving of a valve, the corresponding valve should not transfer into the open position when a high pressure difference between the air spring the ancillary volume is present because, otherwise, this can lead to a spontaneous pressure equalization between the air spring and the ancillary volume because of the large cross section of the connecting line. This can, for example, lead to a spontaneous collapse of the air springs. For example, if the sensors would detect that a motor vehicle goes from movement in a curve to movement along a straight line, then the valves of the wheels are so driven that they, in principle, can transfer from a closed position into an open position. If, at this instant, and because of a leaning of the vehicle still present, there is a still high air pressure in the corresponding air spring, then a spontaneous opening of the valve would lead to a spontaneous pressure equalization between the air spring and the ancillary volume so that the air pressure in the air spring correspondingly drops and the vehicle leans very greatly to one side. For these reasons, the valve should only then open when a small pressure difference is present between the air pressure in the air spring and the air pressure in the ancillary volume. The above description makes clear that the valve in the connecting line is indeed very significant.

German patent publication 1,914,696 discloses an elevation control arrangement for a chassis of a rail vehicle. The vehicle frame of the rail vehicle is suspended by an air spring relative to the undercarriage or bogie. The air spring is connected to an ancillary volume via a connecting line. A valve is mounted in the connecting line and has an open position and a closed position. In the general travel operation of the rail vehicle, the valve is in the closed position and blocks the connecting line between the ancillary volume and the air spring. However, if the rail vehicle travels through a curve, then a leaning of the rail vehicle takes place at the side of the rail vehicle corresponding to the outside of the curve and, as a consequence thereof, the air spring is shortened. Because of this inclination of the rail vehicle, the valve, which is in the connecting line, is driven and transfers perforce from the closed position to the open position so that the ancillary volume is now connected to the air spring and air from the ancillary volume can enter into the air spring. Accordingly, the air pressure in the air spring increases and the rail vehicle is lifted at the side which is at the outside of the curve so that the inclination of the rail vehicle is compensated.

The valve disclosed in German patent publication 1,914,696 includes a complicated configuration and also moves perforce from the closed position into the open position when a large pressure difference is present between the air pressure in the ancillary volume and the air pressure in the air spring. For these reasons, the arrangement disclosed in this patent publication (with an air spring and an ancillary volume and especially the valve known from this arrangement) is not suitable for use in modern motor vehicles.

SUMMARY OF THE INVENTION

It is an object of the invention to provide an arrangement of the kind described above wherein the valve, which is to be actuated by air pressure, has a simple configuration. It is a further object of the invention to provide a valve, which is actuated by air pressure and which has a simple configuration.

The air spring arrangement of the invention includes: an air spring; an ancillary volume; a connecting line connecting the air spring and the ancillary volume to each other; a valve mounted into the connecting line and partitioning the connecting line into first and second connecting line segments; the valve including: a cylinder defining a longitudinal axis; the cylinder defining a chamber and having first and second openings connected to the first and second connecting line segments, respectively, so that the connecting line segments open into the chamber; a piston having an outer side wall surface and being movably mounted in the cylinder so as to be movable along the axis between a first position wherein the outer side wall surface is clear of the first and second openings thereby clearing the connecting line so that the valve is open and a second position wherein the outer side wall surface closes at least one of the first and second openings thereby blocking the connecting line so that the valve is closed; the piston partitioning the cylinder into first and second component chambers having respective volumes which change as the piston moves between the first and second positions; and, means for supplying control air to one of the component chambers to charge the piston therewith.

According to a feature of the invention, the above piston is a hollow piston as the piston can then be moved more simply from the open position into the closed position and vice versa.

The advantages achieved with the invention are especially seen in that the valve, which is introduced into the connecting line, has an extremely simple configuration. Nonetheless, the valve is so configured that it cannot be switched when there are large pressure differences between the air pressure of the air in the air spring and the air pressure of the air in the ancillary volume because, in this case, a high friction occurs at the wall surface of the piston against the chamber wall of the cylinder and the valve, more specifically, the piston cannot be transferred from the closed position into the open position. A further advantage of the invention is seen in that also connecting lines having a very large cross section can be blocked with the aid of the valve according to the invention because the amount of energy which must be developed to clear the connecting line is, even in this case, small.

According to a feature of the invention, the pressure surfaces of the hollow piston facing toward the chambers are of the same size and this, for example, can be achieved in that the end face of the hollow piston (effective pressure surface for a component chamber) is precisely as large as that surface which is delimited by the piston surface (effective pressure surface for the second component chamber). In this embodiment, the piston can only then go into its closed position when the air pressure in the component chamber (to which the control air is conducted) is greater than the system air pressure. In order to achieve this, air pressure is conducted from a compressor or a pressure store to the component chamber.

According to an alternate embodiment of the invention, the effective pressure surface of the piston, which faces toward the component chamber and to which control air is applied, is greater than the effective pressure surface of the piston which faces toward the other component chamber. In this case, the piston can be transferred into its closed position or held in this position in that the system air is applied via the connection of the component chamber as control air.

BRIEF DESCRIPTION OF THE DRAWINGS

The invention will now be described with reference to the drawings wherein:

FIGS. 1a and 1b are schematics of an air spring and an ancillary volume in cross section in accordance with a first embodiment of the invention;

FIGS. 2a and 2b are schematics of an arrangement with an air spring and an ancillary volume in cross section in accordance with a second embodiment of the invention; and, FIGS. 3a and 3b are schematics of an arrangement which includes an air spring and an ancillary volume in cross section in accordance with a third embodiment of the invention.

DESCRIPTION OF THE PREFERRED EMBODIMENTS OF THE INVENTION

FIGS. 1a and 1b show a schematic representation of an arrangement having an air spring 2 and an ancillary volume 4 which are connected to each other via a connecting line 6. Only those components of the arrangement are shown which are essential for the description of the invention.

The connecting line 6 is partitioned by a valve 12 into two parts. A first part 8 and a second part 10 of the connecting line 6 each open into a chamber 16 of the cylinder 14 of the valve 12. A hollow piston 18 is mounted so as to be axially movable in the chamber 16 of cylinder 14. The hollow piston 18 includes an O-ring 20 which performs a sealing function. The O-ring 20 partitions the chamber 16 of the cylinder 14 into a component chamber 16a above the hollow piston 18 and into a component chamber 16b below the hollow piston 18. The two component chambers (16a, 16b) are closed air tight with respect to each other. A control line 22 is connected to the valve 12 and control air is supplied via this control line to the component chamber 16a.

In FIG. 1a, the valve is shown in its open position which is achieved in that the hollow piston 18 is pushed upwardly in such a manner that it does not close the openings 24 and 26. Accordingly, air can flow through the connecting line 6 from the air spring 2 to the ancillary volume 4 or in the reverse direction. The open position of the valve 12, which is shown in FIG. 1a, is achieved in that the upper component chamber 16a is connected via the control line 22 to the atmosphere so that there atmospheric air pressure is present. The arrangement comprises the air spring 2, the connecting line 6 and the ancillary volume 4. Because the air pressure in the arrangement is greater than the atmospheric air pressure, this also applies for the air pressure in the component chamber 16b so that the hollow piston 18 assumes the position shown as a consequence of the pressure gradient.

FIG. 1b shows the valve 12 in its closed position. In this position, the hollow piston 18 lies with its end wall surface 27 on the base of the cylinder 14 and closes the openings 24 and 26 with its wall surface 28. The valve 12 is transferred from the open position (FIG. 1a) into the closed position (FIG. 1b) in that the control line 22 is connected to a compressor and, with the aid of this compressor, the component chamber 16a is supplied with pressurized air. The air pressure is so adjusted in component chamber 16a that this pressure is greater than the air pressure in the arrangement (in the following, system air pressure). As a consequence of the above, the air pressure in the component chamber 16a is greater than in the component chamber 16b. This applies also when, as a consequence of leakage, air penetrates under the hollow piston 18 from the air spring 2 or the ancillary volume 4. The effective pressure surface of the component chamber 16a as well as of the component chamber 16b corresponds to the end face 30 of the hollow piston 18. For this reason, in the sum, a force arises, which is directed in the direction of the cylinder base of cylinder 14, so that the hollow piston 18 maintains the position shown in FIG. 1b.

Referring to FIG. 1b, it will now be explained what happens when the component chamber 16a is connected to the atmosphere via the control line 22. Here, it is first assumed that the air pressure in the air spring 2 is approximately as great as in the ancillary volume 4 so that no pressure gradients, which are too great, can form in the arrangement. In this case, the hollow piston 18 is pushed upwardly by the air present under the hollow piston and, after some time, assumes the position shown in FIG. 1a.

However, if the air pressure, for example, in the air spring 2, is significantly greater than in the ancillary volume 4, then a large pressure gradient is formed in the arrangement by means of which the hollow piston 18 is pressed against the right side wall of the cylinder 14. As a consequence of this pressure, a high friction force develops between one part of the surface 28 of the hollow piston 18 and a part of the side wall of the cylinder 14. This friction force is opposite, in its direction, to the force which develops because of the pressure gradient in the chamber 16 and therefore prevents the hollow piston 18 from transferring from the closed position (FIG. 1*b*) into the open position (FIG. 1*a*). In this way, for a large pressure gradient, the hollow piston 18 remains in its closed position even though the component chamber 16*a* is connected to the atmosphere via the control line 22. The hollow piston 18 only then moves into the open position when the pressures in the air spring 2 and the ancillary volume 4 become comparable.

According to another embodiment of the invention, the piston 18 is configured as a closed piston and, in this case, has a further end face 29 lying opposite the end face 30.

FIGS. 2*a* and 2*b* show an arrangement which, with the exception of the valve 12, is configured in the same way as the arrangement shown in FIGS. 1*a* and 1*b*. The end face 30 of the hollow piston 18 is, in this embodiment, so configured that it projects beyond the surface 28 of the hollow piston 18 so that the end face 30 is greater than the surface 29 delimited by the surface 28. The hollow piston 18 is again mounted so as to be axially movable in the chamber 16 of cylinder 14 and divides the chamber 16 into two volume-changing component chambers (16*a*, 16*b*). The component chamber 16*a* again lies above the hollow piston 18. In this embodiment, the component chamber 16*b* comprises a first part 16*b*' below the hollow piston 18 and, in the open position of the hollow piston 18 (see FIG. 2*a*), a second part 16*b*" which lies outside of the surface 28 and below the end face 30 of the hollow piston 18.

The second part 16*b*" of the component chamber 16*b* is connected via a bore 40 to the atmosphere. Furthermore, the second part 16*b*" of the component chamber 16*b* is separated air tight from the first part 16*b*' of the component chamber 16*b* by the O-ring 42. The effective pressure surface, which faces toward the chamber 16*a*, corresponds to the end face 30 and the effective pressure surface, which faces toward the component chamber 16*b*, with respect to the system air pressure, corresponds to the surface 31 delimited by the surface 28. This means that the hollow piston 18 can be transferred from the open position (see FIG. 2*a*) into the closed position (see FIG. 2*b*) by applying the system air pressure via the control line 22 to the component chamber 16*a*. In this case, the air pressure in the component chamber 16*a* is precisely as great as the air pressure in the first part 16*b*' of the component chamber 16*b* and the hollow piston 18 is pressed downwardly because of the larger effective pressure surface which faces toward the component chamber 16*a* (end face 30). A return of the hollow piston 18 from the closed position into the open position takes place here too in that the component chamber 16*a* is connected via a control line 22 to the atmosphere. Also, the valve 12 shown in FIGS. 2*a* and 2*b* only moves from the closed position into the open position when the pressure gradient within the arrangement is not too great. This occurs for the same reasons as explained in connection with FIGS. 1*a* and 1*b* above.

Also in the embodiment of FIGS. 2*a* and 2*b*, the piston 18 can be configured as a closed piston and has, in this case, a further end face lying opposite the end face 30.

FIGS. 3*a* and 3*b* show a further embodiment which, except for valve 12, is configured precisely as that shown in FIGS. 1*a* and 1*b*.

The valve 12 comprises a cylinder 14 having a chamber 16 wherein a hollow piston 18 is axially movable. The hollow piston 18 is configured exactly as the hollow piston 18 shown in FIGS. 1*a* and 1*b*. However, a further piston 32 projects into the hollow piston 18 and the hollow piston 18 is guided on the piston 32. The piston 32 is connected via a rod 34 fixedly to the base of the cylinder 14. A channel 36 is formed through the rod 34 and connects the volume-changing chamber 38 to the atmosphere so that atmospheric air pressure is always present in this chamber 38. The chamber 38 is enclosed by the hollow piston 18 and the piston 32. The open position of the valve 12 (FIG. 3*a*) is achieved in that the component chamber 16*a* is connected to the atmosphere via the control line 22. Accordingly, in this case, atmospheric air pressure is present in the component chamber 16*a* and system air pressure is present in the component chamber 16*b*. The effective pressure surface in both component chambers 16*a* and 16*b* is the end face 27 of the surface 28 of the hollow piston 18 because the other effective pressure surfaces compensate for the reason that atmospheric air pressure operates thereon and they are of the same size. The hollow piston 18 is held in the position shown in FIG. 3*a* because the air pressure (system air pressure), which works from the component chamber 16*b* on the end face 27 of the surface 28 of the hollow piston 18, is greater than the air pressure (atmospheric air pressure), which operates from the component chamber 16*a* on the same surface.

The valve 12 is transferred from its open position (FIG. 3*a*) into its closed position (FIG. 3*b*) because the component chamber 16*a* is connected via the control line 22 to the system air pressure. In the component chamber 16*a*, the effective pressure surface for the system air pressure is the total end face 30 of the hollow piston 18; whereas, in the component chamber 16*b*, the effective pressure surface for the system air pressure is only the end face 27 of the wall defining surface 28 of the hollow piston 18. Accordingly, the effective pressure surface, which faces the component chamber 16*a*, is significantly greater than the effective pressure surface, which faces toward the component chamber 16*b* for the same air pressure, so that the hollow piston 18 is pressed from the open position into the closed position. A return of the hollow piston 18 from the closed position into the open position is only possible in this embodiment when no pressure gradients are present in the arrangement which are too great (see also the description with respect to FIGS. 1*a* and 1*b*).

It is understood that the foregoing description is that of the preferred embodiments of the invention and that various changes and modifications may be made thereto without departing from the spirit and scope of the invention as defined in the appended claims.

What is claimed is:

1. An air spring arrangement comprising:

an air spring;

an ancillary volume;

a connecting line connecting said air spring and said ancillary volume to each other;

a valve mounted into said connecting line and partitioning said connecting line into first and second connecting line segments;

said valve including: a cylinder having an inner wall surface and defining a longitudinal axis; said cylinder defining a chamber and having first and second openings connected to said first and second connecting line segments, respectively, so that said connecting line segments open into said chamber; a piston having an outer side wall surface and being movably mounted in said cylinder so as to be movable along said axis between a first position wherein said outer side wall surface is clear of said first and second openings thereby clearing said connecting line so that said valve is open and a second position wherein said outer side wall surface closes at least one of said first and second openings thereby blocking said connecting line so that said valve is closed whereby a pressure gradient can develop between said air spring and said ancillary volume causing said piston to be pressed against said inner wall surface of said cylinder which, in turn, causes a friction force to develop between said inner wall surface of said cylinder and said outer side wall of said piston while said piston is in said second position; and, said piston partitioning said cylinder into first and second component chambers having respective volumes which change as said piston moves between said first and second positions; and, supply means for supplying pressurized air; and, means for selectively connecting one of said component chambers to said supply means causing said piston to assume said second position or to the atmosphere whereupon said piston moves from said second position to said first position provided said pressure gradient is not greater than a predetermined magnitude or said piston remains in said second position notwithstanding the connection to the atmosphere because said friction force is sufficiently high because the pressure gradient is greater than said predetermined magnitude.

2. The air spring arrangement of claim 1, said piston being configured as a hollow piston.

3. The air spring arrangement of claim 2, said piston having first and second pressure-effective surfaces facing corresponding ones of said first and second component chambers; and, said first and second pressure-effective surfaces being of equal size.

4. The air spring arrangement of claim 2, said piston having first and second pressure-effective surfaces facing corresponding ones of said first and second component chambers; said one of said component chambers being said first component chamber; and, said first pressure-effective surface being larger than said second pressure-effective surface.

5. The air spring arrangement of claim 3, said hollow piston being a first piston and said arrangement further comprising:

a second piston fixedly mounted in said cylinder and projecting into said hollow piston so as to guide said first piston as said first piston moves between said first and second positions;

said hollow piston and said second piston conjointly defining a sub-component chamber having a volume which changes as said hollow piston moves relative to said second piston; and, channel means for connecting said sub-component chamber to the atmosphere.

6. An air spring arrangement comprising:

an air spring;

an ancillary volume;

a connecting line connecting said air spring and said ancillary volume to each other;

a valve mounted into said connecting line and partitioning said connecting line into first and second connecting line segments;

said valve including: a cylinder defining a longitudinal axis; said cylinder defining a chamber and having first and second openings connected to said first and second connecting line segments, respectively, so that said connecting line segments open into said chamber; a piston having an outer side wall surface and being movably mounted in said cylinder so as to be movable along said axis between a first position wherein said outer side wall surface is clear of said first and second openings thereby clearing said connecting line so that said valve is open and a second position wherein said outer side wall surface closes at least one of said first and second openings thereby blocking said connecting line so that said valve is closed; and, said piston partitioning said cylinder into first and second component chambers having respective volumes which change as said piston moves between said first and second positions;

means for supplying control air to one of said component chambers to charge said piston therewith;

said piston being configured as a hollow piston; said piston having first and second pressure-effective surfaces facing corresponding ones of said first and second component chambers;

said first and second pressure-effective surfaces being of equal size; and, said hollow piston being a first piston and said arrangement further including:

a second piston fixedly mounted in said cylinder and projecting into said hollow piston so as to guide said first piston as said first piston moves between said first and second positions;

said hollow piston and said second piston conjointly defining a sub-component chamber having a volume which changes as said hollow piston moves relative to said second piston; and, channel means for connecting said sub-component chamber to the atmosphere.

7. An air-pressure actuated valve mounted in a connecting line for interconnecting two closed air-filled vessels, said connecting line being partitioned by said valve into first and second connecting line segments, said valve comprising:

a cylinder defining a longitudinal axis;

said cylinder defining a chamber and having first and second openings connected to said first and second connecting line segments, respectively, so that said connecting line segments open into said chamber;

a piston having an outer side wall surface and being movably mounted in said cylinder so as to be movable along said axis between a first position wherein said outer side wall surface is clear of said first and second openings thereby clearing said connecting line so that said valve is open and a second position wherein said outer side wall surface closes at least one of said first and second openings thereby blocking said connecting line so that said valve is closed;

said piston partitioning said cylinder into first and second component chambers having respective volumes which change as said piston moves between said first and second positions;

means for supplying control air to one of said component chambers to charge said piston therewith;

said piston being configured as a hollow piston;

said piston having first and second pressure-effective surfaces facing corresponding ones of said first and second component chambers; and, said first and second pressure-effective surfaces being of equal size; and, said hollow piston being a first piston and said arrangement further including:
  a second piston fixedly mounted in said cylinder and projecting into said hollow piston so as to guide said first piston as said first piston moves between said first and second positions;

said hollow piston and said second piston conjointly defining a sub-component chamber having a volume which changes as said hollow piston moves relative to said second piston; and, channel means for connecting said sub-component chamber to the atmosphere.

* * * * *